United States Patent Office 2,811,540
Patented Oct. 29, 1957

2,811,540

ORGANOPOLYSILOXANE LUBRICANTS AND THEIR PREPARATION

Glenn D. Cooper, Schenectady, N. Y., assignor to General Electric Company, a corporation of New York No Drawing. Application June 24, 1955, Serial No. 517,937

4 Claims. (Cl. 260—448.2)

The present invention relates to organopolysiloxanes having increased lubricity. More particularly, this invention is concerned with a method of preparing liquid organopolysiloxanes which comprises effecting reaction between (a) a liquid chlorinated organopolysiloxane containing an average of from 1.9 to 2.67 organic groups per silicon atom and an average of at least one chlorine atom per organopolysiloxane molecule and (b) a dithiophosphate having the formula (1)        $MSP(S)(OR)_2$ where M is an alkali metal, e. g., sodium, potassium, etc.; and R is a hydrocarbon radical, e. g., alkyl radical, including methyl, ethyl, propyl, butyl, octyl, etc. radical; cycloalkyl radical, including cyclohexyl, cycloheptyl, methylcyclohexyl, etc. radical; aryl radical, including phenyl, diphenyl, methylphenyl, t-butylphenyl, etc. radical; aralkyl radical, including benzyl, xylyl, etc. radical.

The lubrication of bearing surfaces operating under load at high and low temperatures has heretofore presented very difficult or insoluble problems. Certain petroleum lubricants work under load but fail at low temperatures due to a thickening of the lubricant and fail at high temperatures due to oxidation. In order to obviate the difficulties of high and low temperature defects in petroleum lubricants, organopolysiloxanes have been used in many lubricating applications where high and low temperatures are encountered. These organopolysiloxanes have been found satisfactory for many applications since their low coefficient of viscosity allows them to retain the same operating characteristics over a broad temperature range while their outstanding resistance to oxidation at elevated temperatures has obviated the former difficulties with petroleum lubricants. However, the organopolysiloxane lubricants have not been as satisfactory as desired under high loads, particularly, in lubricating the sliding of steel surfaces over other steel surfaces in that the organopolysiloxanes tended to be squeezed out of the lubricated joint.

In an attempt to improve the lubricating properties of organopolysiloxane fluids, it has heretofore been proposed to employ organopolysiloxanes which have chlorine radicals attached to the organic substituents of the silicon atoms of the siloxane chain. The use of chlorinated organopolysiloxanes improves to some extent the lubricating property of the silicone materials without adversely effecting the high or low temperature properties of the material and the viscosity temperature coefficient. However, the chlorinated organopolysiloxane materials are still somewhat deficient in their ability to lubricate the sliding of one steel surface over another under high loads.

Unexpectedly, I have discovered that the lubricating characteristics of organopolysiloxanes are markedly improved by effecting reaction between a liquid chlorinated organopolysiloxane and a dithiophosphate corresponding to Formula 1. The liquid organopolysiloxane material prepared by this method combines improved lubricity with the low viscosity temperature coefficient and the high thermal stability found in earlier organopolysiloxane fluids.

The term "liquid chlorinated organopolysiloxane" as used in the present invention is intended to refer to liquid compositions comprising essentially silicon atoms connected to one another by oxygen atoms. These compositions also contain hydrocarbon and substituted hydrocarbon radicals attached to silicon by silicon-carbon linkages, with an average of from 1.9 to 2.67 hydrocarbon or substituted hydrocarbon groups present per silicon atom. These hydrocarbon groups and substituted hydrocarbon groups may be alkyl or aryl groups as discussed heretofore. Where some of the hydrocarbon and substituted hydrocarbon substituents on silicon are aromatic or substituted aromatic, it is preferred that not more than 50 percent of the organic substituents be aromatic types. At least one of the alkyl substituents attached to silicon per organopolysiloxane molecule contains at least one chlorine substituent. Thus, these chlorinated alkyl substituents attached to silicon may be chloromethyl, dichloromethyl, chlorobutyl, etc. radicals.

These liquid chlorinated organopolysiloxanes are well known in the art and are described, for example, in the following patents: 2,435,148, McGregor et al.; 2,522,053, McGregor et al.; 2,507,316, McGregor et al.; 2,599,984, Fletcher et al. These compositions of matter may be prepared, for example, by the cohydrolysis of hydrolyzable organo-substituted and haloorgano-substituted silanes. Where the hydrolyzable mixture of silanes contains an average of less than two organic radicals per silicon atom, the resulting organopolysiloxane contains some molecules in which hydroxyl groups are attached to silicon in addition to the organic substituents.

The improved organopolysiloxane lubricants of the present invention are prepared by merely heating a mixture of the liquid chlorinated organopolysiloxane with a dithiophosphate within the scope of Formula 1. The ratio of ingredients in this mixture is not critical and may vary from as little as 0.1 percent by weight of the dithiophosphate based on the total weight of the mixture up to 50 percent or more of the dithiophosphate. Preferably, however, we employ from about 10 to 40 percent by weight of the dithiophosphate based on the total weight of the mixture. Since the dithiophosphates are not soluble in the liquid chlorinated organopolysiloxanes, it is desirable to provide means for providing as homogeneous a solution as possible. This may be done by stirring the reaction mixture or by employing a solvent which will dissolve both the liquid chlorinated organopolysiloxane and the thiophosphate. In general, amounts of solvent from about 5 percent to about 100 percent by weight based on the weight of the organopolysiloxane and the thiophosphate is suitable.

The temperature at which the reaction is effected may also vary within wide limits. However, since thermodynamic considerations require an elevated temperature for a high rate of reaction between the liquid chlorinated organopolysiloxane and the thiophosphate, we prefer to employ reaction temperatures of from about 75 to 150° C.

The following example is illustrative of the practice of my invention and is not intended for purposes of limitation.

Example

A liquid chlorinated organopolysiloxane was prepared by mixing 232 grams (0.7 mole) of chloromethylheptamethylcyclotetrasiloxane, 207 grams (0.7 mole) of octamethylcyclotetrasiloxane and 19 grams (0.12 mole) of hexamethyldisiloxane. By the method described in Patnode Patents 2,469,888 and 2,469,890, assigned to the same assignee as the present invention, this mixture of organopolysiloxanes was mixed with about 45 grams of concentrated sulfuric acid and shaken at room temperature for about 4 hours. At the end of this time two layers had formed, the lower of which was acid. The acid was separated from the upper layer of organopolysiloxane, and the upper layer was washed free of acid and dried over anhydrous potassium carbonate to yield a linear chain-stopped organopolysiloxane containing methyl and chloromethyl radicals attached to silicon. This oil had an average chain length of about 50 silicon atoms and contained about 5.6 percent chlorine. 240 grams of this oil, 50 ml. of benzene and 126 grams of potassium diisopropyldithiophosphate, KSP (S) (OC₃H₇)₂, were heated with stirring at 100–105° C. for 7 hours. At the end of this time the mixture was filtered and the resulting oil was devolatilized at 100° C. and 1 mm.

This oil was then tested for its lubricity properties on a Shell Four Ball Wear Tester which comprises a device for holding three rigidly clamped ½ inch steel balls submerged in a lubricant in a metal cup. A fourth rotating steel ball of the same diameter is then pressed into contact with the three stationary balls by a load of 50 kilograms. After rotation of the fourth steel ball for one hour the contact points of the fourth ball with three stationary balls grow to circular scars. The average diameter of these scars in millimeters after an hour's run at 600 R. P. M. is taken as the measurement of wear. From this description it is obvious that the better the lubricating properties of the oil, the lower will be the wear scar. The wear scar of the dithiophosphate-treated oil prepared in this example was 0.56 mm. The wear scar of the liquid chlorinated organopolysiloxane prepared in this example prior to reaction with the dithiophosphate was also measured on the Shell Four Ball Wear Tester under the same conditions. This resulted in a wear scar of 1.42 mm. A typical linear chain-stopped methyl silicone oil having the same viscosity as the product prepared in this example has a wear scar of about 1.85 mm.

The stability at 200° C. of the dithiophosphate-treated oil of the present invention was investigated and found to be about the same as that of the original liquid chlorinated organopolysiloxane prepared in the example.

Although the example describes the preparation of an oil containing only methyl and chloromethyl radicals attached to silicon, it should be understood that the process of the present invention is applicable to other liquid chlorinated organopolysiloxanes such as compositions containing higher chloroalkyl radicals or a mixture of chloroalkyl and chloroaryl radicals attached to silicon. The unsubstituted hydrocarbon radicals attached to silicon may be higher alkyl radicals in addition to methyl or may be aryl radicals such as phenyl, methylphenyl, diphenyl, etc.

The compositions prepared by the method of the present invention are particularly useful in the lubrication of the sliding of one steel surface over another. However, it should be understood that these compositions may also be employed in the many well known fluid organopolysiloxane applications. Thus, these fluids may be employed as lubricants regardless of the type of surface, may be employed as hydraulic fluids, and may be incorporated into grease compositions by incorporating thickening agents such as the soaps ordinarily used for that purpose as thickening agents. These include, for example, lithium stearate, lithium hydroxy stearate, etc. Other additives may be incorporated in the grease to improve certain properties thereof as, for instance, the use of various oxidation inhibitors, such as organic diesters including di-(2-ethylhexyl)-sebacate, etc.

What I claim as new and desire to secure by Letters Patent of the United States is:

1. The method of preparing an organopolysiloxane of improved lubricating properties which comprises effecting reaction between (a) a liquid chlorinated organopolysiloxane containing an average of 1.9 to 2.67 organic groups per silicon atom, said organic groups being selected from the class consisting of alkyl and aryl radicals, and an average of at least one chloroalkyl radical per organopolysiloxane molecule and (b) a compound having the formula MSP(S)(OR)₂ where M is an alkali metal radical and R is a member selected from the class consisting of alkyl, aryl, and aralkyl radicals.

2. The organopolysiloxane fluid prepared by the method of claim 1.

3. The method of preparing a liquid organopolysiloxane of improved lubricity which comprises heating (1) a linear, chain-stopped organopolysiloxane having all of its valences other than the valences satisfied by the siloxane bond being satisfied by methyl and chloromethyl radicals with (2) potassium diisopropyldithiophosphate.

4. The product prepared by the method of claim 3.

No references cited.